United States Patent
Zahra et al.

(10) Patent No.: US 7,194,570 B2
(45) Date of Patent: Mar. 20, 2007

(54) METHOD AND DEVICE FOR SELECTING THE OPERATING MODE OF AN INTEGRATED CIRCUIT

(75) Inventors: Claude Zahra, Allauch (FR); Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 299 days.

(21) Appl. No.: 10/784,430

(22) Filed: Feb. 23, 2004

(65) Prior Publication Data

US 2004/0165458 A1  Aug. 26, 2004

(30) Foreign Application Priority Data

Feb. 24, 2003  (FR) .................................. 03 02230

(51) Int. Cl.
*G06F 13/00* (2006.01)
(52) U.S. Cl. .................. 711/102; 711/101; 711/103; 365/94
(58) Field of Classification Search ................ 711/101, 711/102, 103; 365/94
See application file for complete search history.

(56) References Cited

U.S. PATENT DOCUMENTS

| | | | |
|---|---|---|---|
| 4,751,667 A | 6/1988 | Ross | |
| 5,062,075 A | 10/1991 | Yoshida et al. | |
| 5,546,578 A * | 8/1996 | Takada | 707/5 |
| 5,602,789 A * | 2/1997 | Endoh et al. | 365/185.03 |
| 5,781,485 A * | 7/1998 | Lee et al. | 365/201 |
| 5,812,491 A * | 9/1998 | Shinozaki et al. | 365/233 |
| 5,826,007 A | 10/1998 | Sakaki et al. | |
| 6,075,738 A * | 6/2000 | Takano | 365/210 |
| 6,628,542 B2 * | 9/2003 | Hayashi et al. | 365/158 |
| 6,762,951 B2 * | 7/2004 | Itoh et al. | 365/149 |
| 6,989,861 B2 * | 1/2006 | Schinner | 348/231.6 |
| 2004/0139074 A1 * | 7/2004 | Epstein | 707/6 |

\* cited by examiner

*Primary Examiner*—Stephen C. Elmore
*Assistant Examiner*—Daniel Kim
(74) *Attorney, Agent, or Firm*—Lisa K. Jorgenson; William R. McClellan; Wolf, Greenfield & Sacks, P.C.

(57) ABSTRACT

A device for selecting an operating mode of an integrated circuit, comprising a ROM storing at least one predetermined value formed of data words, a non-volatile programmable memory controllable to store said predetermined value, a comparator indicating how many data words of the value stored in the programmable memory are identical to the data words of the predetermined value, and a control means deactivating a selection signal for selecting the operating mode when the number of identical words is greater than a predetermined threshold.

28 Claims, 1 Drawing Sheet

METHOD AND DEVICE FOR SELECTING THE OPERATING MODE OF AN INTEGRATED CIRCUIT

BACKGROUND OF THE INVENTION

1. Field of the Invention

The present invention relates to the selection of an operating mode of an integrated circuit from among several modes, in particular by means of a single programming means which enables definitively forbidding or selecting a predetermined operating mode.

2. Discussion of the Related Art

Known integrated circuits comprise a device for selecting between a reserved mode providing access to all the circuit functionalities, and a user mode providing access to a limited number of the circuit functionalities. Such a device is used, for example, to initially start a circuit in a reserved mode enabling testing of the circuit and storing of confidential information therein. The selection device can then be locked to allow the circuit to start only in a user mode which does not enable reading or modifying the stored confidential information.

FIG. 1 schematically shows an integrated circuit 2 (IC) intended for a secure application, for example supported by a smart card, and comprising a functional block 4 (FUNCT) which provides a control signal COM to an input terminal of a selection device 6 (SELECT), and to receive a selection signal SEL from an output terminal of device 6. Device 6 comprises a fuse 7 connected between a supply voltage Vdd and the output terminal of device 6, the melting of which is controlled by the reception of an active signal COM. The environment of circuit 2, connected to block 4 by an input/output access 8, is not shown.

Block 4 is provided to operate in the reserved mode if it receives an active signal SEL, that is, as long as fuse 7 has not melted, and in the user mode otherwise. An equivalent system may also use an anti-fuse which closes a circuit to make a function inactive. Signal COM is inactive as long as no operator controls its activation. Initially, that is, after manufacturing of the circuit, fuse 7 has not melted and block 4 operates in the reserved mode. An operator can test and program block 4 via access 8. Once the testing and the programming of block 4 are over, the operator controls block 4 to provide an active signal COM to the input terminal of device 6 to melt fuse 7 and cause a definitive selection of the user mode.

Fuse 7 is made in the integrated circuit so as to forbid a user from reactivating the reserved mode by a keying of signal SEL. Unfortunately, such a fuse may under certain conditions form again after having melted. The non-volatile character of the programming of the state of signal SEL performed by the fuse is then lost.

Further, controlling the melting of a fuse requires a significant power, which requires block 4 or device 6 to comprise power elements. Such elements increase the circuit size and consumption.

Moreover, the forming of fuses in an integrated circuit requires the use of certain manufacturing steps, for example, steps of deposition of a tunnel oxide, which are not available in all integrated circuit manufacturing processes, for example, those of integrated circuits with a ferromagnetic memory. It is thus not currently possible to form a circuit with a ferromagnetic memory provided with an operating mode selection device such as in FIG. 1.

SUMMARY OF THE INVENTION

An object of the present invention is to provide a device for selecting the operating mode of an integrated circuit that can be definitively locked and that comprises no fuse or anti-fuse exhibiting similar problems.

Another object of the present invention is to provide such a device that takes up a reduced surface area.

Another object of the present invention is to provide such a device that has a reduced power consumption.

The present invention also aims at an integrated circuit comprising such a selection device.

Another object of the present invention is a method for selecting the operating mode of an integrated circuit such as implemented by such a selection device.

To achieve these and other objects, the present invention provides a device for selecting an operating mode of an integrated circuit, comprising a ROM storing at least one predetermined value formed of data words, a non-volatile programmable memory controllable to store said predetermined value, a comparator indicating how many data words of the value stored in the programmable memory are identical to the data words of the predetermined value, and a control means deactivating a selection signal for selecting the operating mode when the number of identical words is greater than a predetermined threshold.

According to an embodiment of the present invention, the value stored in the programmable memory varies with time and the device comprises a writing means for, when the selection signal is deactivated, rewriting at an interval that can be regular or not the predetermined value into the programmable memory.

According to an embodiment of the present invention, the writing means is provided to rewrite the predetermined value into the programmable memory upon each powering-on of the integrated circuit when the selection signal is deactivated.

According to an embodiment of the present invention, the writing means, the comparator, and the control means are implemented in software form by a microprocessor.

According to an embodiment of the present invention, said threshold corresponds to from 70% to 90% of the number of compared words.

According to an embodiment of the present invention, the device comprises a functional block provided to operate in a first operating mode when the selection signal is activated and to operate in a second operating mode otherwise, the functional block enabling controlling the programmable memory to store the predetermined value.

The present invention also aims at a method for selecting an operating mode of an integrated circuit between a reserved mode and a user mode, comprising:

a) determining how many data words of a value stored in a non-volatile programmable memory of the circuit are identical to data words of at least one predetermined value stored in a ROM of the circuit; and b) selecting the user mode when the number of identical words is greater than a predetermined threshold.

According to an embodiment of the present invention, said threshold corresponds to from 70% to 90% of the number of words of the predetermined value.

The present invention also aims at a method for locking the user mode selected by the implementation of the above method, comprising preventing storage of a value other than the predetermined value in the programmable memory.

According to an embodiment of the present invention, the predetermined value is copied into the programmable memory at least at each circuit power-on.

BRIEF DESCRIPTION OF THE DRAWINGS

The foregoing objects, features, and advantages of the present invention will be discussed in detail in the following non-limiting description of specific embodiments in connection with the accompanying drawings.

DETAILED DESCRIPTION

Figure 1:
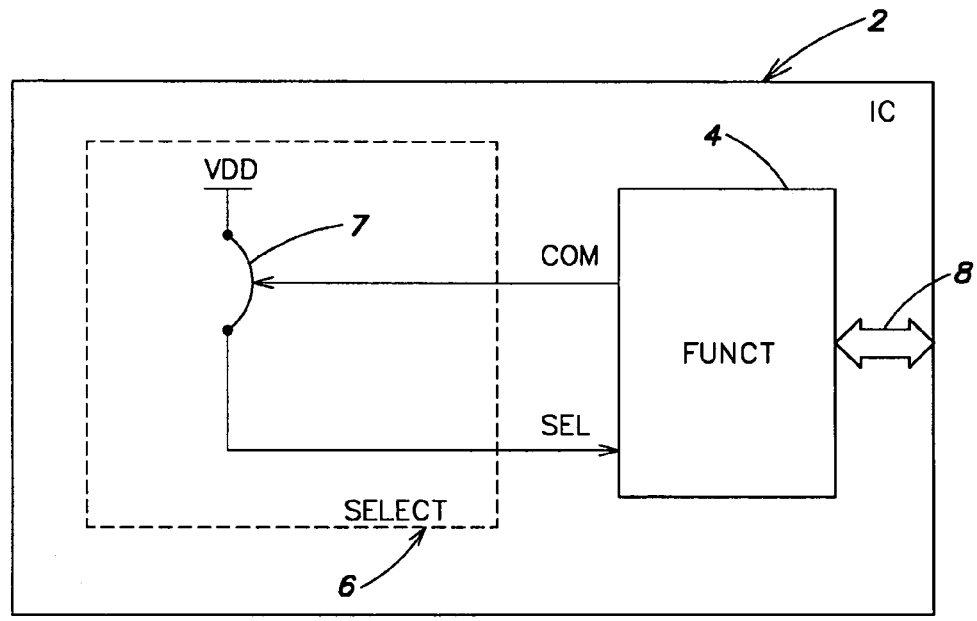
FIG. 1, previously described, schematically shows an integrated circuit provided with a conventional operating mode selection device.

The same elements have been designated with the same reference numerals in the different drawings. Only those elements that are necessary to the understanding of the present invention have been shown.

Figure 2:
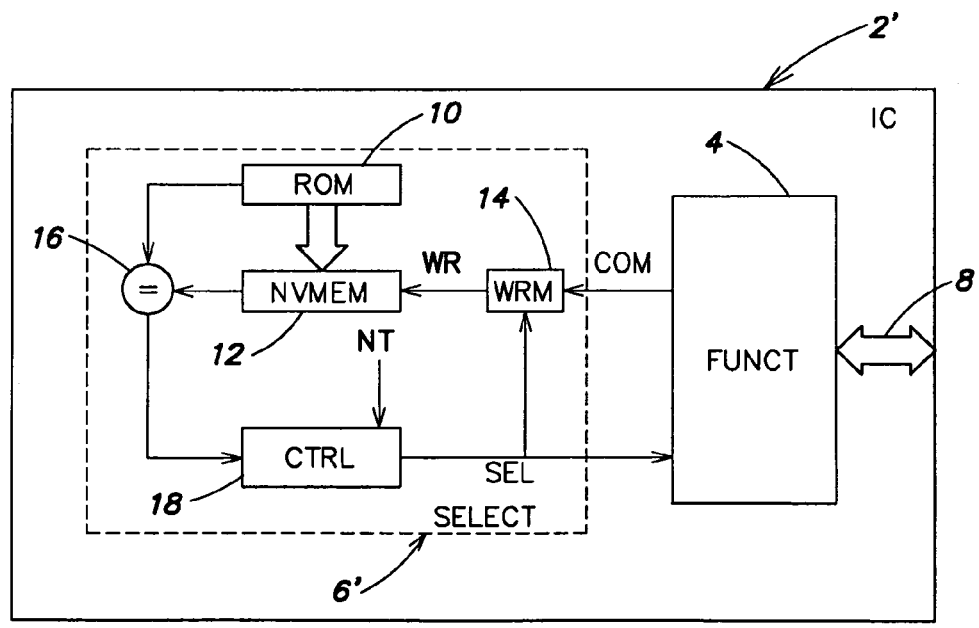
FIG. 2 schematically shows an integrated circuit provided with an operating mode selection device according to an embodiment of the present invention.

FIG. 2 schematically shows an integrated circuit 2' (IC) comprising a functional block 4 (FUNCT) connected to an environment not shown by an input/output access 8. Block 4 provides a signal COM to a selection device 6' (SELECT) according to the present invention, and receives a signal SEL from device 6'.

According to an embodiment of the present invention, device 6' comprises a ROM 10 storing a predetermined value (or code) formed of data words. A non-volatile programmable memory 12 (NVMEM), for example, of FeRAM type, preferably of the same size as memory 10, is connected to copy the content of ROM 10 as a response to the activation of a write signal WR generated by a write means 14 (WRM). Write means 14 is provided to activate signal WR as a response to the activation of signal COM or after a powering-on of the circuit if signal SEL is inactive. A comparator 16 is connected to indicate how many words contained in memory 12 are identical in order and content to the words contained in memory 10. A control means 18 (CTRL) connected to the output of comparator 16 generates an active signal SEL as long as the number of identical words is smaller than a predetermined threshold NT. Threshold NT, which will be described in further detail hereafter, is preferably smaller than the total number N of the words stored in memory 10. In the context of the present invention, a word may be formed of a single bit.

Block 4 operates as previously in the reserved mode if it receives an active signal SEL and in the user mode otherwise. Signal COM is inactive as long as no operator controls its activation. Memory 12 is such that initially, that is, after manufacturing of the circuit and before any writing, it stores an undetermined value. This undetermined value mainly depends on the structure of memory 12, and may be evaluated by simulation and confirmed by characterization. Threshold NT and the value stored in memory 10 are selected so that memories 10 and 12 initially store an identical number of words smaller than threshold NT, so that control means 18 initially generates an active signal SEL. Block 4 thus initially operates in the reserved mode. Threshold NT preferably corresponds to from 70% to 90% of the number of words of the predetermined value stored in memory 10.

To select the user mode, an operator may require from block 4 to activate signal COM and thereby to copy the predetermined value stored in memory 10 into memory 12. All the words in memory 12 being then identical to those of memory 10, a threshold NT is exceeded and control means 18 deactivates signal SEL. The connection of memory 12 is such that it is not possible to write into memory 12 a value other than the predetermined value stored in memory 10. The user mode selection is definitive, and it is no longer possible to select the reserved mode.

In known fashion, a value stored in a non-volatile memory such as memory 12 may vary with time, for example under the effect of radiation. Preferably, threshold NT is selected according to the characteristics of memory 12 so that the number of identical words in memories 10 and 12 remains greater than threshold NT despite a small variation in the value stored in memory 12. Further, to avoid such a variation eventually making the value stored in memory 12 too different from the predetermined value stored in memory 10, write means 14 is provided to rewrite (refresh) the predetermined value into memory 12, for example, each time the circuit is powered on when signal SEL is inactive. The choice of another refresh interval (for example, periodic) is within the abilities of those skilled in the art according to the memory 12 used and to the application (especially according to the time for which the circuit is powered). The two intervals (upon each powering-on and periodic) may of course be combined.

The present invention thus enables using a non-volatile programmable memory having relatively low data conservation performance, which reduces the device cost.

Another advantage of the present invention is that device 6' can be formed in any technology enabling manufacturing of non-volatile programmable memories, especially ferromagnetic memories.

Another advantage of the present invention is that device 6' takes up a reduced surface area and requires no power element to melt a possible fuse.

A selection device according to the present invention has been shown as separately comprising a writing means, a comparator, and a control means. However, the present invention also provides, according to an embodiment, software implementation of the write means, of the comparator, and of the control means by means of a microprocessor.

The present invention has been described in relation with an embodiment in which the ROM stores a single predetermined value, but in practice, the ROM may store several predetermined values which are copied together in the non-volatile memory. The comparator may in this case determine the number of identical words for each of the values separately. The control means then deactivates the selection signal if the number of identical words is greater than the threshold for each value, or for a predetermined number of values.

Of course, the present invention is likely to have various alterations, modifications, and improvements which will readily occur to those skilled in the art. In particular, a selection device has been shown as separate from the functional block of the integrated circuit, but it may in practice be integrated to the functional block, especially in the case of a microprocessor.

Further, the present invention has been described in relation with a selection between a reserved mode and a user mode, but those skilled in the art will readily adapt the present invention to a larger number of operating modes. The reserved mode may thus be divided into a plurality of reserved sub-modes. As an example, each reserved sub-mode may correspond to a value of the programmable memory which belongs to a range closer to or more remote from the value of the ROM, granting the user rights which are all the greater as the range is close to the value of the ROM.

Moreover, the user mode may be divided into several operating sub-modes, the selection of which may be conventionally controlled by software or by an activation of specific pins.

The present invention has been described in relation with an integrated circuit having its functional block switching to the user mode as soon as the selection signal generated by the selection device is inactive, but those skilled in the art will readily adapt the present invention to an integrated circuit having its functional block switching to the user mode at the first powering-on which follows the activation of the selection signal.

Finally, the selection of the number and of the size of the words stored in the memories as well as of the threshold from which it is considered that there is an identity between them is within the abilities of those skilled in the art according to the application and especially to the reliability of the non-volatile character of the programmable memory. For example, in an application to smart cards, two predetermined values of one byte are used and the threshold is of six bits per byte (75%). The size of a word in the meaning of the present invention then is of one bit. A byte-to-byte identity may also be provided with a threshold of six bytes out of eight.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for selecting an operating mode of an integrated circuit, comprising:
    a ROM storing at least one predetermined value formed of data words;
    a non-volatile programmable memory controllable to store said predetermined value;
    a comparator indicating how many data words of the value stored in the programmable memory are identical to the data words of the predetermined value; and
    control means deactivating a selection signal for selecting the operating mode when the number of identical words is greater than a predetermined threshold.

2. The device of claim 1, wherein the value stored in the programmable memory varies with time and the device comprises writing means for, when the selection signal is deactivated, rewriting at intervals the predetermined value into the programmable memory.

3. The device of claim 2, wherein said writing means are provided to rewrite the predetermined value into the programmable memory upon each powering-on of the integrated circuit when the selection signal is deactivated.

4. The device of claim 2, wherein said writing means, the comparator, and the control means are implemented in software form by a microprocessor.

5. The device of claim 1, wherein said threshold corresponds to from 70% to 90% of the number of compared words.

6. An integrated circuit comprising the device of claim 1 and further comprising a functional block provided to operate in a first operating mode when the selection signal is activated and to operate in a second operating mode otherwise, the functional block enabling controlling the programmable memory to store the predetermined value.

7. A method for selecting an operating mode of an integrated circuit between a reserved mode and a user mode, comprising:
    a) determining how many data words of a value stored in a non-volatile programmable memory of the circuit are identical to data words of at least one predetermined value stored in a ROM of the circuit; and
    b) selecting the user mode when the number of identical words is greater than a predetermined threshold.

8. The method of claim 7, wherein said threshold corresponds to from 70% to 90% of the number of words of the predetermined value.

9. A method for locking the user mode selected by the implementation of the method of claim 7, comprising preventing storage of a value other than the predetermined value in the programmable memory.

10. The user mode locking method of claim 9, wherein the predetermined value is copied into the programmable memory at least at each powering-on of the circuit.

11. A device for selecting an operating mode of an integrated circuit, comprising:
    a read-only memory configured to store at least one predetermined value including data words;
    a non-volatile programmable memory configured to store the predetermined value in response to a control signal;
    a comparator configured to indicate a number of data words in the programmable memory that are identical to the data words of the predetermined value; and
    a control circuit configured to deactivate a mode select signal when the number of identical words indicated by the comparator is greater than a predetermined threshold.

12. A device as defined in claim 11, wherein the control circuit is configured to enable rewriting of the programmable memory when the mode select signal is inactive.

13. A device as defined in claim 12, wherein the control circuit is configured to enable rewriting of the programmable memory on power up.

14. A device as defined in claim 12, wherein the control circuit is configured to enable rewriting of the programmable memory periodically.

15. A device as defined in claim 11, wherein the programmable memory comprises a ferromagnetic memory.

16. A device as defined in claim 11, wherein the predetermined threshold is in a range from 70% to 90% of the number of words of the predetermined value stored in the read-only memory.

17. A device as defined in claim 11, wherein the control circuit is configured to control two or more reserved modes.

18. A device as defined in claim 11, wherein the control circuit is configured to control two or more user modes.

19. A device as defined in claim 11, wherein the control circuit is configured to enable a user mode upon a first power up of the integrated circuit after deactivation of the mode select signal.

20. A device as defined in claim 11, wherein the comparator requires byte-to-byte identity of the data words in the programmable memory and the data words of the predetermined value.

21. A device as defined in claim 11, wherein the comparator requires bit-to-bit identity of the data words in the programmable memory and and the data words of the predetermined value.

22. An integrated circuit comprising:
a mode select device for selecting an operating mode of the integrated circuit, comprising:
   a read-only memory configured to store at least one predetermined value including data words;
   a non-volatile programmable memory configured to store the predetermined value in response to a control signal;
   a comparator configured to indicate a number of data words in the programmable memory that are identical to the data words of the predetermined value; and
   a control circuit configured to deactivate a mode select signal when the number of identical words indicated by the comparator is greater than a predetermined threshold; and
a functional block for providing the control signal to the mode select device and configured to operate in different operating modes according to a state of the mode select signal.

23. An integrated circuit as defined in claim 22, wherein the functional block is configured to operate in a reserved mode in response to an active state of the mode select signal and to operate in a user mode in response to a deactivated state of the mode select signal.

24. A method for selecting an operating mode of an integrated circuit, comprising:
   storing in a read-only memory at least one predetermined value of data words;
   storing the predetermined value in a non-volatile programmable memory in response to a control signal;
   determining a number of data words in the programmable memory that are identical to the data words of the predetermined value; and
   deactivating a mode select signal when the determined number of identical data words is greater than a predetermined threshold.

25. A method as defined in claim 24, further comprising rewriting the predetermined value into the programmable memory at intervals after the mode select signal is deactivated.

26. A method as defined in claim 24, wherein the steps of determining and deactivating are performed under software control.

27. A method as defined in claim 24, wherein the steps of determining and deactivating are performed under hardware control.

28. A device for selecting an operating mode of an integrated circuit, comprising:
   a read-only memory storing at least one predetermined value of data words;
   a non-volatile programmable memory storing the predetermined value in response to a control signal;
   means for determining a number of data words in the programmable memory that are identical to the data words of the predetermined value; and
   means for deactivating a mode select signal when the determined number of identical data words is greater than a predetermined threshold.

* * * * *

UNITED STATES PATENT AND TRADEMARK OFFICE
CERTIFICATE OF CORRECTION

PATENT NO. : 7,194,570 B2 Page 1 of 1
APPLICATION NO. : 10/784430
DATED : March 20, 2007
INVENTOR(S) : Zahra Claude and Yannick Teglia It is certified that error appears in the above-identified patent and that said Letters Patent is hereby corrected as shown below:

Claim 21, col. 6, line 66 should read:
--programmable memory and the data words of the--

Signed and Sealed this

Fourth Day of March, 2008

JON W. DUDAS
*Director of the United States Patent and Trademark Office*